United States Patent [19]
Smith et al.

[11] Patent Number: 5,901,205
[45] Date of Patent: * May 4, 1999

[54] ADAPTIVE VOICE AND DATA BANDWIDTH MANAGEMENT SYSTEM FOR MULTIPLE-LINE DIGITAL SUBSCRIBER LOOP DATA COMMUNICATIONS

[75] Inventors: Richard K. Smith, Seminole; Thomas J. Bingel, Belleair, both of Fla.

[73] Assignee: Paradyne Corporation, Largo, Fla.

[ * ] Notice: This patent is subject to a terminal disclaimer.

[21] Appl. No.: 08/953,904

[22] Filed: Oct. 20, 1997

Related U.S. Application Data

[63] Continuation-in-part of application No. 08/772,734, Dec. 23, 1996, Pat. No. 5,841,840

[60] Provisional application No. 60/038,328, Feb. 26, 1997.

[51] Int. Cl.$^6$ .................................................. H04M 11/00
[52] U.S. Cl. ..................................... 379/93.01; 379/93.07; 379/93.09
[58] Field of Search ............................. 379/93.07, 93.09, 379/93.11, 93.28, 100.12

[56] References Cited

U.S. PATENT DOCUMENTS

| | | | |
|---|---|---|---|
| 4,596,021 | 6/1986 | Carter et al. | 375/5 |
| 4,862,456 | 8/1989 | Giorgio | 370/118 |
| 5,317,415 | 5/1994 | Kinami et al. | 358/425 |
| 5,506,866 | 4/1996 | Bremer et al. | 375/216 |

OTHER PUBLICATIONS

Marketing Material from Diamond Multimedia, "Shotgun Technology," © 1997 Diamond Multimedia Systems, Inc., pp. 1–2.

Marketing Material from Diamond Multimedia, "Shotgun Technology and Dual Modems—White Papers," © 1997 Diamond Multimedia Systems, Inc., pp. 1–6.

Marketing Material from Diamond Multimedia, "Diamond Doubles Modem Speed," © 1997 Diamond Multimedia Systems, Inc., pp. 1–3.

Internet Engineering Task Force–Request for Comment (IETF–RFC 1990) on PPP Multilink Protocol (MP), Aug. 1996, pp. 1–41.

*Primary Examiner*—Paul Loomis
*Assistant Examiner*—Melur Ramakrishnaiah
*Attorney, Agent, or Firm*—Thomas, Kayden Horstemeyer & Risley, L.L.P.

[57] ABSTRACT

An adaptive voice and data bandwidth management system is implemented in a subscriber loop to permit higher data rates and adaptive allocation of this increased capacity between multiple applications. The management system communicates digital data across multiple-lines when these lines are not in use by other communication equipment. However, when a request for use of a line by another device is detected, a modem clears down a subscriber line and connects the subscriber line to the appropriate communication device. As a result, simultaneous use of a modem and other communication devices is allowed. Once the other communication device ends its communication session, the system adapts to once again communicate digital data over multiple lines in order to increase the speed and efficiency of the data communication.

17 Claims, 5 Drawing Sheets

ADAPTIVE VOICE AND DATA BANDWIDTH MANAGEMENT SYSTEM FOR MULTIPLE-LINE DIGITAL SUBSCRIBER LOOP DATA COMMUNICATIONS

CROSS REFERENCE TO RELATED APPLICATIONS

This document is filed as a continuation-in-part of application entitled MULTIPLE LINE MODEM AND METHOD FOR PROVIDING VOICE ON DEMAND, assigned Ser. No. 08/772,734, and filed Dec. 23, 1996, now U.S. Pat. No. 5,841,840, and is hereby incorporated by reference, and this application claims benefit of provisional application 60/038,328 filed Feb. 26, 1997.

FIELD OF THE INVENTION

The present invention generally relates to telephony and data communication and, more particularly, to a system and method of increasing data rates and adaptively allocating this increased capacity between multiple applications.

BACKGROUND OF THE INVENTION

Many current designs for high-speed Digital Subscriber Line (DSL) modem devices include a plain old telephone system (POTS) splitter enabling simultaneous telephone and high-speed data use. There are numerous problems with designing suitable POTS splitters and, because of this, some high-speed DSL modems are being planned, similar to conventional modems, where a telephone is essentially connected in parallel with the DSL modem across the subscriber line. With this configuration, the user has only alternate use of the telephone or the modem.

Since a conventional parallel modem/telephone arrangement does not permit simultaneous telephone use and modem use, many users install a second phone line so others can call them or they can call out when the original subscriber line is tied up for modem use. This second phone line can also then provide a "teen line" capability which permits two independent voice connections simultaneously whenever the modem is not in use. Unfortunately, there is currently no design allowing the modem to make use of the added bandwidth available when only the modem is in use.

Thus, a heretofore unaddressed need exists in the industry for a system and method for providing a multi-line telephone/DSL modem arrangement which allows multiple-line data communications when the telephone is not in use.

SUMMARY OF THE INVENTION

The present invention overcomes the inadequacies and deficiencies of the prior art as discussed herein. The present invention provides an adaptive voice and data bandwidth management system and method for providing multiple-line digital subscriber loop data communications when telephones are not in use.

The adaptive voice and data bandwidth management system and method of the present invention utilize a first digital subscriber line, a second digital subscriber line, a telephone, and a multi-line DSL modem. In accordance with the preferred embodiment of the present invention, the first digital subscriber line is configured to at least relay digital data, and the second digital subscriber line is configured to at least relay digital data and voice signals. In accordance with this embodiment, the multi-line DSL modem is coupled to the first digital subscriber line and the second digital subscriber line. When a telephone call is not occurring, the multi-line DSL modem communicates digital data across both the first digital subscriber line and the second digital subscriber line. When the multi-line DSL modem determines that a telephone call is occurring, the multi-line DSL modem clears down the digital data on the second digital subscriber line and then relays voice signals between the second digital subscriber line and the telephone.

The adaptive voice and data bandwidth management system and method of the present invention have many advantages, one of which, for example, is that they provide for higher data rates by adaptively allocating increased capacity between multiple applications, thus providing faster and more efficient high-speed data communication.

Other features and advantages of the present invention will become apparent to one skilled in the art upon examination of the following description, drawings and claims.

BRIEF DESCRIPTION OF THE INVENTION

The present invention can be better understood with reference to the following drawings. The elements of the drawings are not necessarily to scale, emphasis instead being placed upon clearly illustrating principles of the present invention. Furthermore, like reference numerals designate corresponding parts throughout the several views.

DETAILED DESCRIPTION OF THE INVENTION

Figure 1:
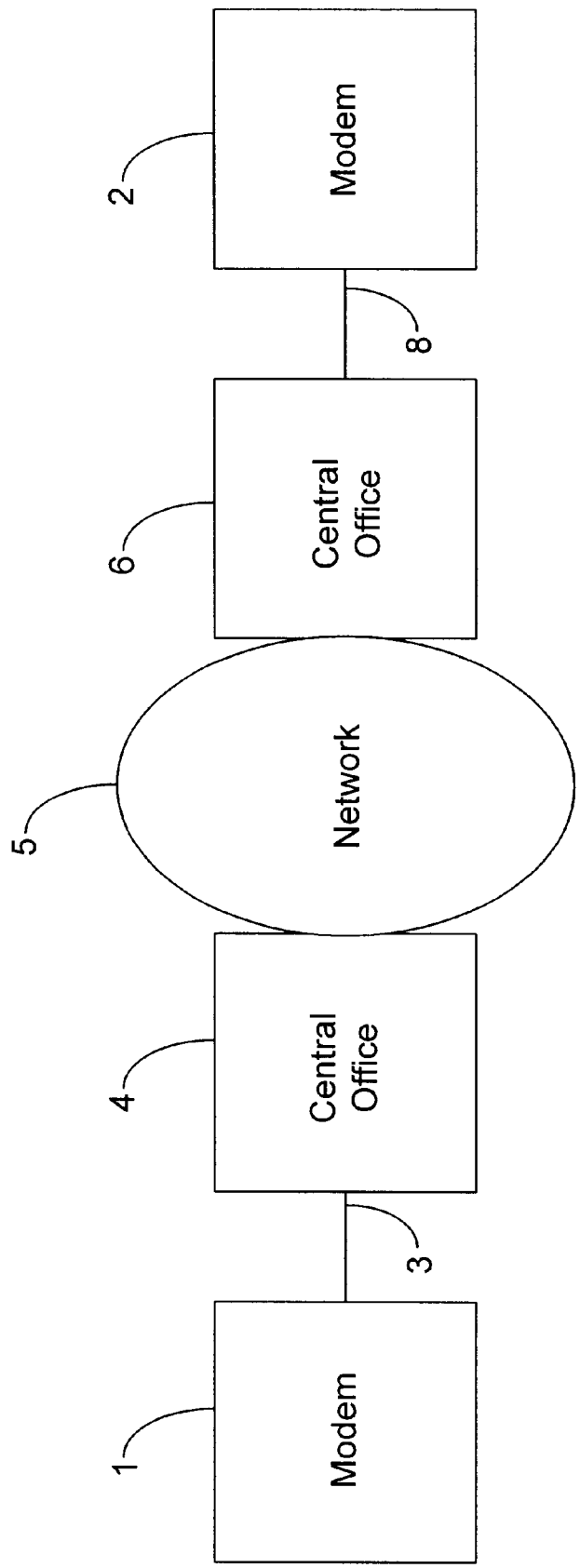
FIG. 1 is a block diagram illustrating a typical communication system in accordance with the prior art.

A typical arrangement of a communication network is depicted in FIG. 1. In FIG. 1, a user modem 1 communicates to a remote modem 2 by transmitting signals across connection 3 to a central office 4 servicing the user's premises. The signal is then routed from central office 4 through a network 5 to a central office 6 servicing the premises of the remote modem 2. The central office 6 then transmits the signal to remote modem 2 via connection 8. It should be noted that connection 3 and 8 are preferably twisted pair communication lines so that communication may exist in either direction between user modem 1 and remote modem 2.

Figure 2:
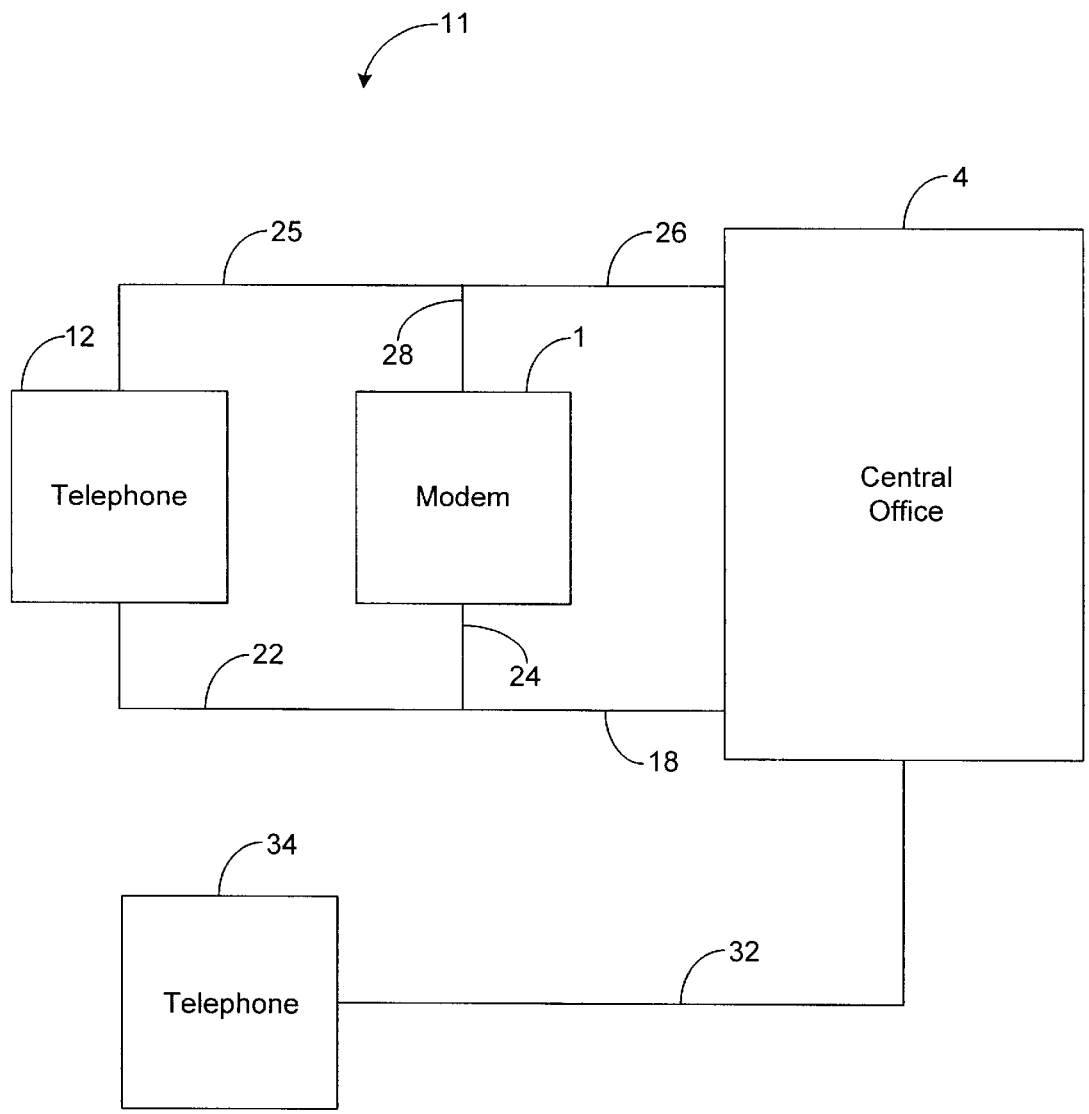
FIG. 2 is a block diagram illustrating a possible implementation of a subscriber loop in accordance with the prior art.

A typical subscriber loop 11 having a parallel arrangement of a telephone 12 and a modem 1 is depicted in FIG. 2. Signals transmitted from a central office 4 are communicated across connections 18 and 22 to telephone 12 and are communicated across connections 18 and 24 to modem 1. Signals transmitted from telephone 12 are relayed to central office 4 across connections 25 and 26, and signals transmitted from modem 1 are relayed across connections 26 and 28. Since signals transmitted to and from central office 4 share connections 18 and 26, simultaneous operation of telephone 12 and modem 1 is not possible.

Many users have installed a second subscriber line to enable telephone use when modem 1 is operating. This is illustrated in FIG. 2 by connection 32 and telephone 34. Connection 32 is a twisted pair subscriber line allowing communication between central office 4 and telephone 34. With this arrangement, a user always has the capability of phone use with telephone .34 since connection 32 is independent of the loop 11 servicing telephone 12 and modem 1. Therefore, simultaneous operation of telephone 34 and modem 1 is possible.

When modem 1 is not in use, a user has the capability of operating telephone 12 and telephone 34 simultaneously. However, when modem 1 is in use and neither phone 12 nor 34 is in use, the user receives no extra benefit from maintaining two subscriber lines since the operation of modem 1 is independent of connection 32.

Figure 3:
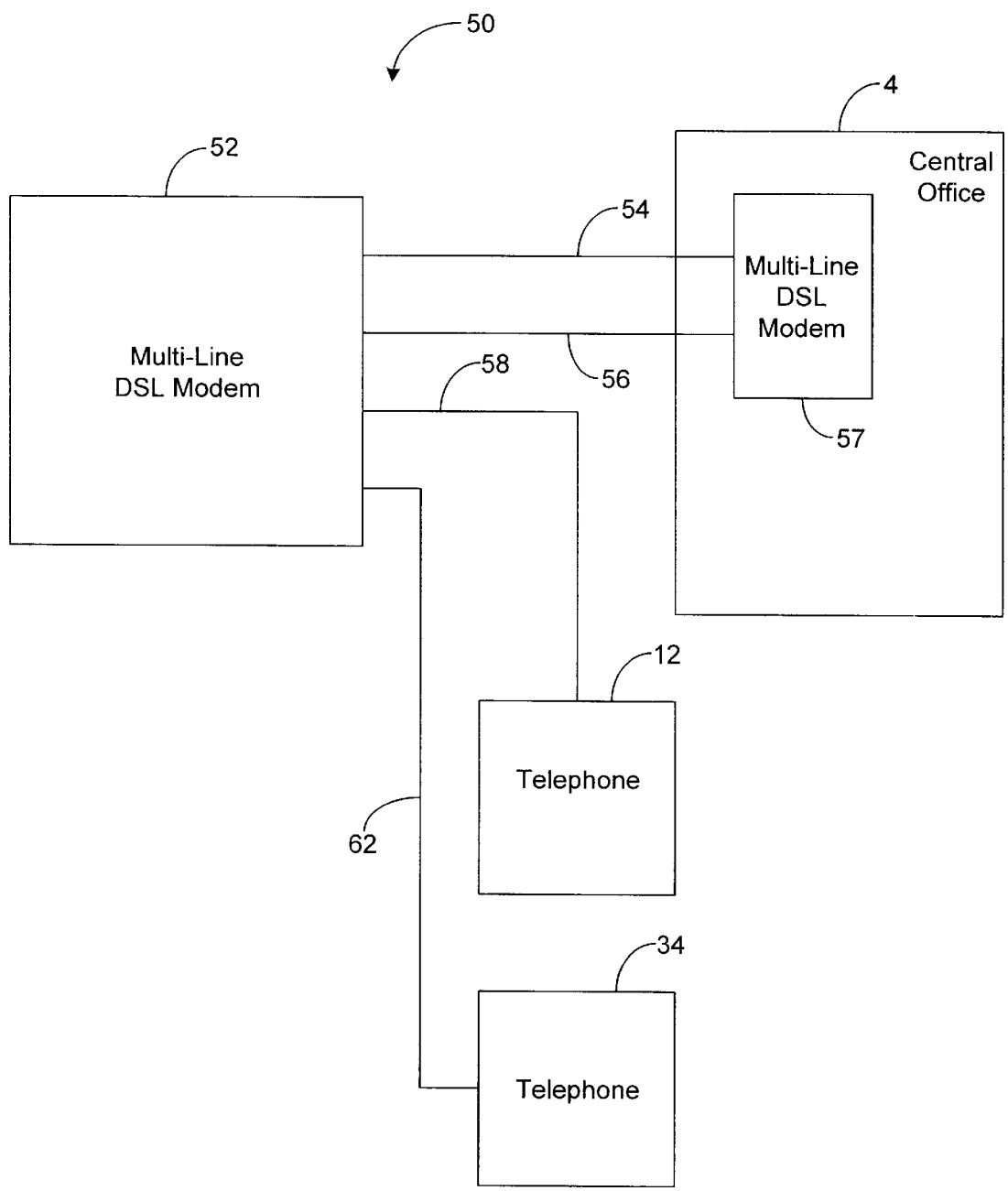
FIG. 3 is a block diagram illustrating a possible implementation of an adaptive voice and data bandwidth management system in accordance with the present invention.

FIG. 3 illustrates a block diagram of the adaptive voice and data bandwidth management system 50 of the present invention. As depicted in FIG. 3, the adaptive voice and data bandwidth management system 50 of the present invention permits increased performance of a multi-line DSL modem 52 in the absence of use with telephones 12 and 34. With reference to FIG. 3, connections 54 and 56 are preferably twisted pair digital subscriber lines configured to allow independent voice and digital data communication between central office 4 and multi-line DSL modem 52. Furthermore, connections 58 and 62 are preferably twisted pair communication lines allowing voice communication to and from telephones 12 and 34, respectively.

Central office 4 is preferably configured to include a multi-line DSL modem 57 compatible with user modem 52. Modem 57 is preferably designed to have knowledge of incoming calls (calls from remote modem 2) and to have control of the transmission of signals from central office 4. By the same token, modem 52 is preferably configured to have knowledge of the hookswitch state of telephones 12 and 34 and to have control of the transmission of signals from its end.

Multi-line DSL modems 52 and 57 are configured to provide data communication across both connections 54 and 56 when neither telephone 12 nor 34 is in use. Modems 52 and 57 can communicate across both connections 54 and 56 using methods similar to well-known digital line sharing device techniques. By using both connections 54 and 56, the speed and efficiency of data communication is increased. Since digital line sharing techniques are well known in the art, a detailed discussion of line sharing techniques will not be provided herein. It will be apparent to those skilled in the art, in view of the discussion provided herein, how such techniques can be utilized to achieve the objectives of the present invention.

Modem 57 is configured to detect an incoming call request and to notify modem 52 of the call request. This notification can occur by any technique known in the art including, but not limited to, an in-band or out-band secondary or control channel. Upon receipt of the notification, modem 52 is preferably configured to clear down the transmission of data on connection 56 and to signal modem 57 when the data communication on connection 56 has ceased. Modem 52 is then designed to bridge connection 56 to connection 58 so that voice communication may be established between telephone 12 and central office 4. As used herein, the term "bridge" refers to any method known in the art to allow communication of data or voice signals from one connector to another.

Upon receiving notice that connection 56 has been cleared down, modem 57 is preferably designed to bridge connection 56 to POTS devices at the central office 4. In this configuration, connection 56 represents a traditional POTS connection between telephone 12 and central office 4, and POTS communication may occur over connection 56 through techniques well known in the art. Furthermore, while connection 56 is being used for POTS communication, modem 52 is communicating data over connection 54 at a single line rate.

If modem 57 receives an incoming call request while POTS communication already exists over connection 56, modem 57 is preferably configured to again notify modem 52 of the request. Modem 52 may reject the request by sending a rejection signal to modem 57 which returns a busy signal to the caller. Alternatively, modem 52 may accept the request by sending an acceptance signal to modem 57. If modem 52 transmits an acceptance signal, then modems 52 and 57 are preferably configured to establish POTS communication over connection 54 as described hereinabove for connection 56. In such a situation, modem 52 is designed to bridge connection 54 to telephone 34, and modem 57 is designed to bridge connection 54 to POTS devices at the central office 4. While in this configuration, separate POTS communication exists over connections 54 and 56, and no data communication exists between modems 52 and 57.

Instead of modem 52 detecting an incoming call, modem 52 may detect a call request by detecting an off-hook condition of telephone 12. When a call request is detected, modem 52 is preferably configured to clear down the data on connection 56 and to momentarily go on-hook to the central office 4 notifying modem 57 that a call request is present. In response, modem 57 is configured to bridge connection 56 to POTS devices at the central office 4, and modem 52 is then designed to establish POTS communication. In this configuration, single line data communication exists between modem 52 and central office 4 via connection 54, and voice communication exists between telephone 12 and central office 4 via connections 56 and 58.

It should be noted that modem 52 may accept a call request from telephone 34 by the same method as described hereinbefore with telephone 12. However, if telephone 12 is communicating with central office 4 via connection 56, then modem 52 is preferably configured to establish POTS communication between telephone 34 and central office 4 with connection 54. In such a configuration, telephones 12 and 34 are communicating with central office 4 over connection 54 and 56, respectively, and modem 52 is not communicating with central office 4.

It should be noted that the present invention is not limited to a two-line DSL modem 52 operating in conjunction with two telephones 12 and 34. It should be apparent to those skilled in the art that any number of multi-line DSL modems may be used in conjunction with any number of telephones in accordance with the present invention.

OPERATION

The preferred use and operation of the adaptive voice and data bandwidth management system 50 of the present invention and associated methodology will now be described with reference to FIG. 3 and FIG. 4.

In the case when neither telephone 12 nor 34 is in use, modem 52 can communicate digital data across both connections 54 and 56 using methods similar to well-known line sharing device techniques. When central office 4 receives an incoming call request destined for telephone 12, modem 57 signals to modem 52 that there is an incoming call. Upon receipt of this notification, modem 52 can ignore the request, display caller ID information or ring telephone 12. In the event that the decision is made to take the call and ring telephone 12, modem 52 gracefully clears down the data transmissions on connection 56 and then signals modem 57 once the clearing down of connection of 56 is complete. Modem 57 then bridges connection 56 to a POTS device in central office 4, and modem 52 then bridges connection 56 to connection 58 and allows a ringing voltage to pass through modem 52 to connection 58. At this point, modem 52 is operating at a single digital subscriber line data rate by communicating digital data across connection 54 while telephone 12 is communicating with central office 4 through connections 56 and 58.

Instead of receiving a call request from central office 4, modem 52 can receive a call request from telephone 12 by detecting an off-hook condition from connection 58. In this case, modem 52 can optionally generate a busy signal to off-hook telephone 12 through connection 58 or can accept the call request. If modem 52 accepts the call request, then modem 52 will clear down the data on connection 56 and notify modem 57 that a call request has been detected. Modem 57 will then bridge connection 56 to a POTS device at central office 4, and modem 57 will bridge connections 56 and 58 providing dial tone from the central office 4 to telephone 12. At this point, modem 52 will be operating at the single digital subscriber line data rate by communicating digital data across connection 54, and telephone 12 will be simultaneously communicating to central office 4 through connections 56 and 58.

Figure 4A:
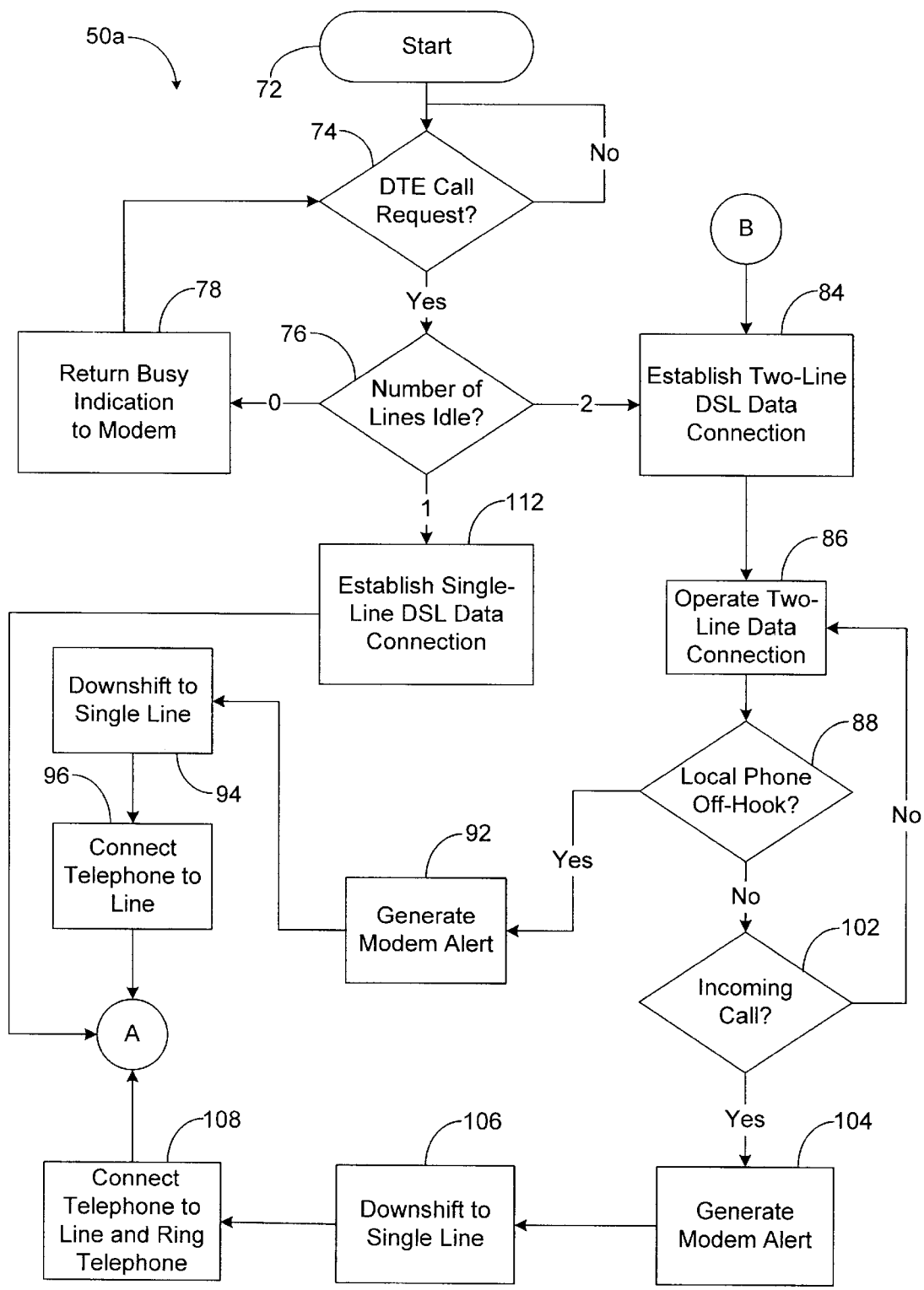
FIG. 4 is a flow chart illustrating the operations of the adaptive voice and data bandwidth management system shown in FIG. 3 in accordance with the preferred embodiment of the present invention.
Figure 4B:
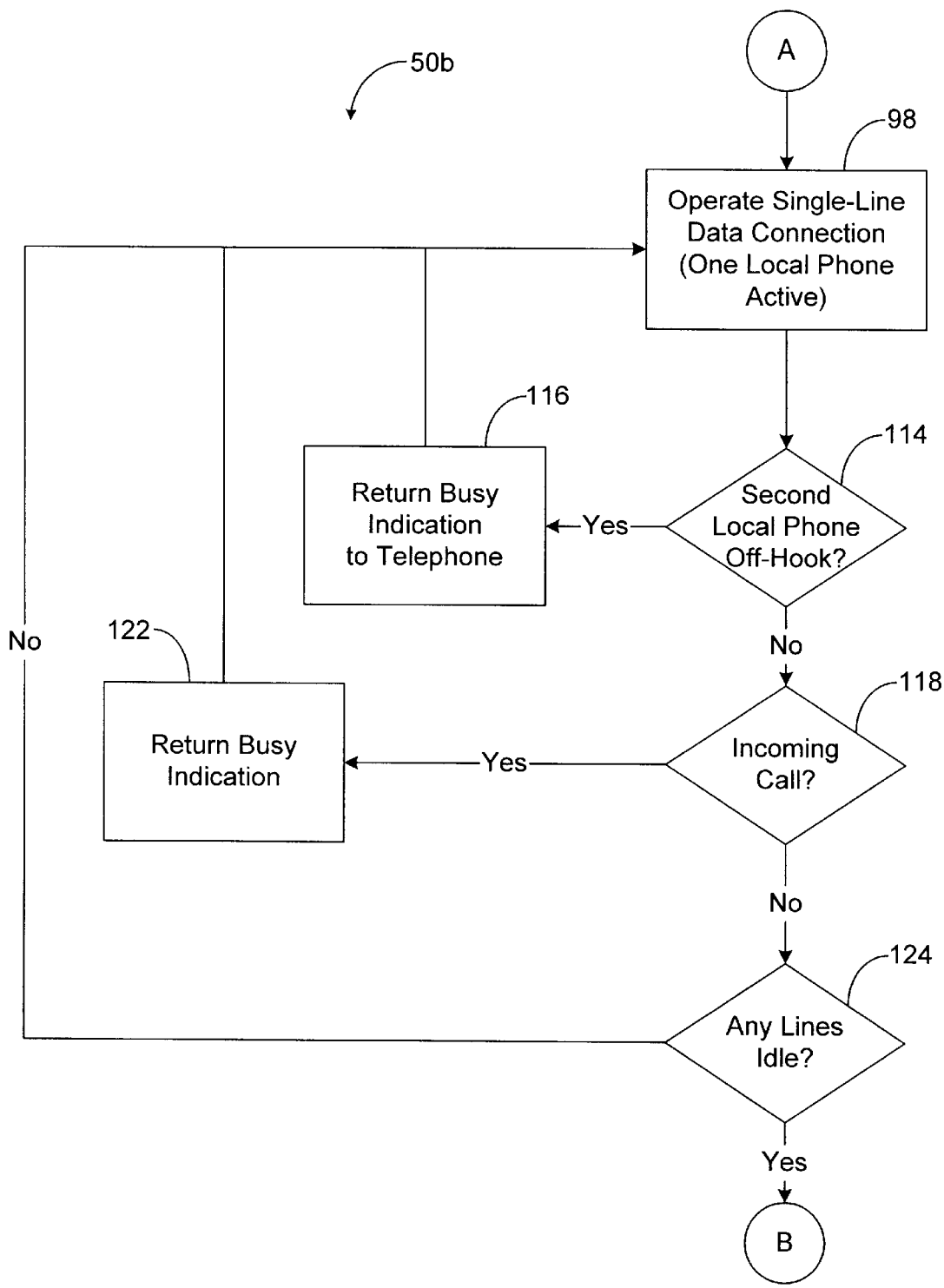

To further illustrate the operation of the adaptive voice and data bandwidth management system 50 of the present invention, FIG. 4 depicts the functionality of the adaptive voice and data bandwidth management system 50 of the present invention. Referring to 50a in FIG. 4A, modem 52 is not in communication with central office 4 at block 72. As shown by block 74, modem 52 waits for a request to communicate digital data. Once a request for digital data is received, modem 52 determines how many connections are available for use at block 76. If all connections are currently in use, then modem 52 continuously retries until a connection becomes available as depicted by blocks 78 and 74.

If two connections are available at block 76, then modem 52 establishes and operates two-line data communication as depicted by blocks 84 and 86. At block 88, modem 52 checks for an off-hook condition, and, if such condition exists, modem 52 switches to single-line operation as depicted by blocks 92 through 98 of FIG. 4A and FIG. 4B. If an off-hook condition does not exist, then modem 52 checks for an incoming call request, as shown by block 102. If there is no incoming call, modems 52 and 57 continue with two-line operation. However, if there is an incoming call, then modem 52 switches to a single-line operation as depicted by blocks 104 through 108 and 98.

If one connection is available as indicated at block 76, then modem 52 establishes and operates single-line data communication as indicated at blocks 98 and 112. If an off-hook condition is detected during single-line operation, a busy indication is returned and single-line operation continues as shown by blocks 98, 114, and 116 of 50b in FIG. 4B.

If an incoming call is detected instead, a busy indication is returned and single-line operation continues as shown by blocks 98 and 122. If a digital subscriber line is freed during single-line operation, then modem 52 establishes and operates two-line data communication, as shown by blocks 84, 86 and 124. Accordingly, modem 52 establishes and operates data communication depending on the number of digital subscriber lines currently available.

It should be noted that between blocks 118 and 122, the user can optionally be given the opportunity to accept the incoming call. Caller identification information can be presented to the user to help make this decision. If the user decides not to accept the incoming call, then block 122 is implemented and the process continues as described hereinabove. However, if the user decides to accept the incoming call, then the remaining data connection is cleared down, and the incoming call is allowed to proceed on this cleared down connection. At this point, the process would return to block 72. It should be noted that the aforementioned process of accepting an incoming call during single line data operation is optional and is not necessary for the operation of the present invention.

In concluding the detailed description, it should be noted that is will be apparent to those skilled in the art that many variations and modifications may be made to the preferred embodiment without substantially departing from the principles of the present invention. All such variations and modifications are within the spirit and the scope of the present invention, as set forth in the following claims.

Wherefore, the following is claimed:

1. An adaptive voice and data bandwidth management system for multiple-line digital data communications, comprising:

a first connection configured to relay digital data and voice signals;

a second connection configured to relay digital data; and a first multiple-line modem coupled to said first connection and to said second connection and configured to communicate digital data across said second connection, to communicate digital data across said first connection when a telephone call is not in progress, and to communicate voice signals across said first connection when a telephone call is in progress.

2. The system of claim 1, wherein said first connection is a digital subscriber line.

3. The system of claim 1, wherein said second connection is a digital subscriber line.

4. The system of claim 1, wherein said first modem is located at a central office.

5. The system of claim 1, wherein said first modem communicates said voice signals across said first connection by bridging said first connection to a third connection coupled to a communications device.

6. The system of claim 1, further comprising:

a fourth connection; and a second multiple-line modem coupled to said first connection and to said fourth connection and configured to clear down data communication on said first connection and to bridge said fourth connection to said first connection when a call request is detected.

7. The system of claim 6, wherein said second modem is a user modem.

8. The system of claim 6, wherein said fourth connection is a telephone connection.

9. The system of claim 6, wherein said first modem is configured to notify said second modem when a call request is detected.

10. The system of claim 6, wherein said second modem is configured to detect a call request on said fourth connection and to notify said first modem when said call request is detected.

11. An adaptive voice and data management method for multiple-line digital data communications, comprising the steps of:

communicating digital data simultaneously across a first connection and a second connection;

detecting a first call request;

stopping data communication across said first connection in response to said first call request;

bridging said first connection to a third connection when said first call request is detected; and simultaneously communicating voice signals across said first connection and said digital data across said second connection when said first connection is bridged to said third connection.

12. The method of claim 11, wherein said first call request corresponds to an incoming call.

13. The method of claim 11, wherein said first call request corresponds to an off-hook condition of a user telephone.

14. The method of claim 11, wherein said first connection is a first digital subscriber line and said second connection is a second digital subscriber line.

15. The method of claim 11, further comprising the steps of:

detecting when a call corresponding to said first call request is terminated; and reestablishing simultaneous data communication across said first connection and said second connection when said call is terminated.

16. The method of claim 11, further comprising the steps of:

detecting a second call request while said first connection is bridged to said third connection;

stopping data communication across said second connection in response to said second call request;

bridging said second connection to a fourth connection when said second call request is detected; and simultaneously communicating voice signals across said first connection and said second connection when said second connection is bridged to said fourth connection.

17. The method of claim 11, wherein said third connection is a telephone connection.

\* \* \* \* \*